US008510689B1

(12) United States Patent
White

(10) Patent No.: US 8,510,689 B1
(45) Date of Patent: Aug. 13, 2013

(54) METHOD AND SYSTEM FOR IMPLEMENTING CONTEXT SIMULATION

(75) Inventor: David White, San Jose, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 35 days.

(21) Appl. No.: 13/210,179

(22) Filed: Aug. 15, 2011

Related U.S. Application Data

(62) Division of application No. 11/768,851, filed on Jun. 26, 2007, now Pat. No. 8,001,512.

(51) Int. Cl.
*G06F 17/50* (2006.01)

(52) U.S. Cl.
USPC .............................. 716/104; 716/55; 716/101

(58) Field of Classification Search
USPC ............................................ 716/55, 101, 104
See application file for complete search history.

(56) References Cited

U.S. PATENT DOCUMENTS

| | | | |
|---|---|---|---|
| 7,080,349 B1 * | 7/2006 | Babcock et al. ............... | 716/53 |
| 7,124,386 B2 | 10/2006 | Smith et al. | |
| 7,152,215 B2 | 12/2006 | Smith et al. | |
| 7,174,520 B2 * | 2/2007 | White et al. .................. | 716/136 |
| 7,243,316 B2 | 7/2007 | White et al. | |
| 7,302,672 B2 * | 11/2007 | Pack et al. ......................... | 430/5 |
| 7,325,206 B2 | 1/2008 | White et al. | |
| 7,353,475 B2 | 4/2008 | White et al. | |
| 7,356,783 B2 | 4/2008 | Smith et al. | |
| 7,360,179 B2 | 4/2008 | Smith et al. | |
| 7,363,099 B2 | 4/2008 | Smith et al. | |
| 7,363,598 B2 | 4/2008 | Smith et al. | |
| 7,367,008 B2 | 4/2008 | White et al. | |
| 7,380,220 B2 | 5/2008 | Smith et al. | |
| 7,383,521 B2 | 6/2008 | Smith et al. | |
| 7,393,755 B2 | 7/2008 | Smith et al. | |
| 8,144,995 B2 * | 3/2012 | Thompson ..................... | 382/218 |
| 2005/0037522 A1 | 2/2005 | Smith et al. | |
| 2005/0051809 A1 | 3/2005 | Smith et al. | |
| 2005/0132306 A1 | 6/2005 | Smith et al. | |
| 2005/0196964 A1 | 9/2005 | Smith et al. | |
| 2005/0235246 A1 | 10/2005 | Smith et al. | |
| 2007/0101305 A1 | 5/2007 | Smith et al. | |
| 2007/0157139 A1 | 7/2007 | White et al. | |
| 2007/0256039 A1 | 11/2007 | White | |
| 2008/0027698 A1 | 1/2008 | White | |
| 2008/0160646 A1 | 7/2008 | White et al. | |

(Continued)

OTHER PUBLICATIONS

U.S. Appl. No. 11/678,593, filed Feb. 24, 2007.

(Continued)

*Primary Examiner* — Thuan Do
(74) *Attorney, Agent, or Firm* — Vista IP Law Group, LLP

(57) ABSTRACT

A method, system, and computer program product are disclosed for using pattern-dependent models at early stages of the design process. This addresses the key disadvantage of prior approaches which are restricted to using such models later in the design process for IC designs that are nearly complete. Pattern-dependent manufacturing effects are extracted from early stage designs and using the extracted pattern-dependent effects to efficiently and effectively design the integrated circuit. One or more contexts are built around one or more units of the design, with examples of units being a block or cell. The units are then used in the context to generate pattern-dependent data as a basis for one or more pattern-dependent models.

20 Claims, 17 Drawing Sheets

(56) References Cited

U.S. PATENT DOCUMENTS

| | | |
|---|---|---|
| 2008/0162103 A1 | 7/2008 | White et al. |
| 2008/0163139 A1 | 7/2008 | Scheffer et al. |
| 2008/0163141 A1 | 7/2008 | Scheffer et al. |
| 2008/0163142 A1 | 7/2008 | White et al. |
| 2008/0163148 A1 | 7/2008 | Scheffer et al. |
| 2008/0163150 A1 | 7/2008 | White et al. |
| 2008/0216027 A1 | 9/2008 | White et al. |
| 2009/0031261 A1 | 1/2009 | Smith et al. |
| 2009/0031271 A1 | 1/2009 | White et al. |
| 2009/0199139 A1 | 8/2009 | White et al. |

OTHER PUBLICATIONS

U.S. Appl. No. 11/678,592, filed Feb. 24, 2007.
U.S. Appl. No. 11/678,594, filed Feb. 24, 2007.
Non-Final Office Action dated Mar. 3, 2010 for U.S. App. No. 11/768,851.
Final Office Action dated Aug. 18, 2010 for U.S. App. No. 11/768,851.
Non-Final Office Action dated Dec. 29, 2010 for U.S. App. No. 11/768,851.
Notice of Allowance dated Apr. 7, 2011 for U.S. App. No. 11/768,851.

* cited by examiner

METHOD AND SYSTEM FOR IMPLEMENTING CONTEXT SIMULATION

CROSS REFERENCE TO RELATED APPLICATION(S)

This application constitutes a divisional patent application of U.S. application Ser. No. 11/768,851, now U.S. Pat. No. 8,001,512, filed Jun. 26, 2007 and entitled "METHOD AND SYSTEM FOR IMPLEMENTING CONTEXT SIMULATION". The content of the aforementioned U.S. Patent Application is hereby expressly incorporated by reference in its entirety.

BACKGROUND AND SUMMARY

The invention is directed to an improved approach for designing, testing, and manufacturing integrated circuits.

A semiconductor integrated circuit (IC) has a large number of electronic components, such as transistors, logic gates, diodes, wires, etc., that are fabricated by forming layers of different materials and of different geometric shapes on various regions of a silicon wafer.

Many phases of physical design may be performed with computer aided design (CAD) tools or electronic design automation (EDA) systems. To design an integrated circuit, a designer first creates high level behavior descriptions of the IC device using a high-level hardware design language. An EDA system typically receives the high level behavior descriptions of the IC device and translates this high-level design language into netlists of various levels of abstraction using a computer synthesis process. A netlist describes interconnections of nodes and components on the chip and includes information of circuit primitives such as transistors and diodes, their sizes and interconnections, for example.

An integrated circuit designer may uses a set of layout EDA application programs to create a physical integrated circuit design layout from a logical circuit design. The layout EDA application uses geometric shapes of different materials to create the various electrical components on an integrated circuit and to represent electronic and circuit IC components as geometric objects with varying shapes and sizes. After an integrated circuit designer has created an initial integrated circuit layout, the integrated circuit designer then verifies and optimizes the integrated circuit layout using a set of EDA testing and analysis tools. Verification may include, for example, design rule checking to verify compliance with rules established for various IC parameters.

Typically, geometric information about the placement of the nodes and components onto the chip is determined by a placement process and a routing process. The placement process is a process for placing electronic components or circuit blocks on the chip and the routing process is the process for creating interconnections between the blocks and components according to the specified netlist.

Based upon this geometric information, photomasks are created for lithographic manufacturing of the electronic product. A photomask, or more simply a "mask," provides the master image of one layer of a given integrated chip's physical geometries. A typical photolithography system projects UV light energy on to and through the mask in order to transmit the mask pattern in reduced size to the wafer surface, where it interacts with a photosensitive coating on the wafer.

Other processes may also occur during the process of manufacturing an intenerated circuit. For example, etching, Electroplated copper deposition (ECD), and chemical mechanical polishing (CMP) may be used to form interconnects for the IC. The lithographic patterns define the dimensions of the circuitry that is transferred to a silicon wafer, with the patterns subsequently used with the etch process to physically etch the features into the wafer surface or other thin films deposited on the wafer surface. Etch equipment includes mechanisms to selectively remove materials (e.g. oxide) from a wafer surface or thin films on the wafer surface patterned with lithography equipment. ECD is a process step in a copper damascene flow that is used to deposit copper material within the interconnect structures.

However, significant variations may arise during the process of manufacturing the IC. For example, lithography mask creation and printing assume that projection is done on a film, within a predetermined depth of focus range. However pattern dependencies between the process by which the ICs are fabricated and the pattern that is being created often cause processed films to have significant variation in thickness across a surface, resulting in variation in feature dimensions (e.g. line widths) of ICs that are patterned using the mask.

Variations in feature density, widths, and heights may also occur during the CMP and plating processes. Variations based upon CMP and plating process are often caused by oxide loss, dishing, erosion, or other copper losses. For ECD, the goal is to completely fill an etched trench region in a void-free manner while minimizing a variation in the deposited copper thickness and minimizing a variation in surface topography. There may exist pattern-dependencies in ECD that result in plated surface variation. Film thickness variation in CMP processes can be separated into various components: lot-to-lot, wafer-to-wafer, wafer-level, and die-level. Often, the most significant component is the pattern dependent die-level component. Die-level film thickness variation is often due to differences in layout patterns on the chip. For example, in the CMP process, differences in the underlying metal pattern result in large long-range variation in the post CMP film thickness, even though a locally planar surface topography is achieved.

As successive non-conformal layers are deposited and polished, the variation becomes worse. The variations may lead to numerous problems and flaws in a manufactured IC, such as timing failures, decreased performance, and increased power consumption. As just one example, because interconnect lines and connections on higher layers carry power to portions of the chip, the variations can increase the sheet resistance and thus affect the power effectiveness of the chip.

One way to reduce the variations in fabricated chips is to make physical measurements on manufactured wafers containing initial designs of devices and use these measurements to adjust the mask design. Other methods to reduce variation include optical proximity correction (OPC) where subwavelength distortions due to patterned features are identified and corrected.

Another approach is to use a pattern-dependent model to predict variations of feature dimensions of an integrated circuit. Pattern-dependent models can also be used to predict topological variations of an integrated circuit. Further details regarding one approach for implementing and using pattern-dependent models is disclosed in US Patent Publication 2003/0229412, which is hereby incorporated by reference in its entirety.

SUMMARY OF THE INVENTION

The present invention is directed to a method, system, and computer program product for using pattern-dependent models at early stages of the design process. This addresses the key disadvantage of prior approaches which are restricted to using such models later in the design process for IC designs that are nearly complete. In some embodiment, the present invention provides an approach for extracting pattern-dependent manufacturing effects from early stage designs and using the extracted pattern-dependent effects to efficiently and effectively design the integrated circuit. In some embodiments, the invention operates by building a context around one or more units of the design, with examples of units being a block or cell. The units are then used in the context to generate pattern-dependent data as a basis for one or more pattern-dependent models. The pattern-dependent models can then be used to design the integrated circuit.

Other and additional objects, features, and advantages of the invention are described in the detailed description, figures, and claims.

DETAILED DESCRIPTION

As used herein, the term "model" refers to a set of data that identifies one or more specific characteristics within an IC design, layout, and/or data relating to its effect, manufacturability, and/or usability. Examples of such models include manufacturability models, CMP (chemical metal polishing) models, lithography models, and electrical models.

Typically, manufacturing models are run on IC designs that are complete or nearly complete. By operating upon complete or nearly complete designs, this provides sufficient information for an EDA tool to perform the appropriate analysis to extract manufacturing and pattern-related effects. The key limitation of the existing approaches is that they can only be performed later in the design process. If it is desired to compute such effects earlier in the design process, then conventional approaches cannot satisfy this requirement.

Embodiments of the present invention address key disadvantage of prior approaches which are restricted to using such models later in the design process for IC designs that are nearly complete. In some embodiment, the present invention provides an approach for extracting pattern-dependent manufacturing effects from early stage designs and using the extracted pattern-dependent effects to efficiently and effectively design the integrated circuit. In some embodiments, the invention operates by building a context around one or more units of the design, with examples of units being a block or cell. The units are then used in the context to generate pattern-dependent data as a basis for one or more pattern-dependent models. The pattern-dependent models can then be used to design the integrated circuit.

Figure 1:
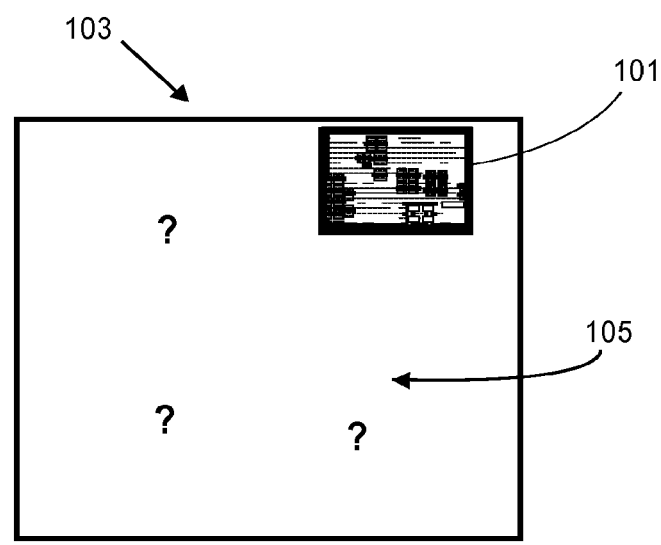
FIG. 1 illustrates a block/cell located within an unfinished layout.

FIG. 1 illustrates a general circumstance to which the invention may be applied. This figure shows an early stage of an IC design 103 in which a particular block or cell 101 may have already been identified for insertion into the layout. The block/cell 101 may be a pre-existing design portion that is being reused, or it may be an entirely new design portion that is specific to the present IC design. At this stage, the surrounding layout portions 105 has not been implemented. As such, the exact configuration of the blocks and routes that surround block/cell 101 may be unknown.

Figure 2:
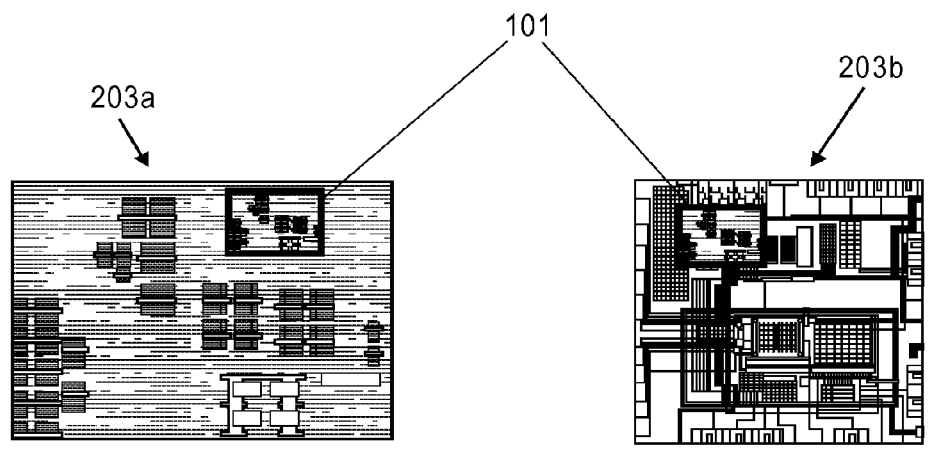
FIG. 2 illustrates a block/cell within two different contexts.

As illustrated in FIG. 2, some embodiments of the invention are generally implemented by placing the block/cell 101 into different locations within contexts 203a and 203b. The contexts 203a and 203b may include a series of chip designs similar to the environment the block or cell 101 may experience in a production design. The contexts 203a and 203b may also include designs from a prior node that are shrunk to simulate the effects of the next node. The locations may be chosen randomly or may be selected based on design related restrictions, for example a set of allowed placements within the design. Models may be used and/or generated based upon the different locations and contexts. The block/cell 101 may be placed into any suitable number of locations and contexts. Simulation may be performed to build a distribution of values for the different locations and/or contexts. For each location within the block/cell 101, there will be a set of model predictions for each placement. Wafer level variation models could also be used to predict a set of die location specific parameters and these may be included in the distribution as well. The results of the processing may be used to implement a design to help minimize the negative effects of variations from the manufacturing process. The results of this processing may be used to improve electrical simulation of the cell or block.

Figure 3:
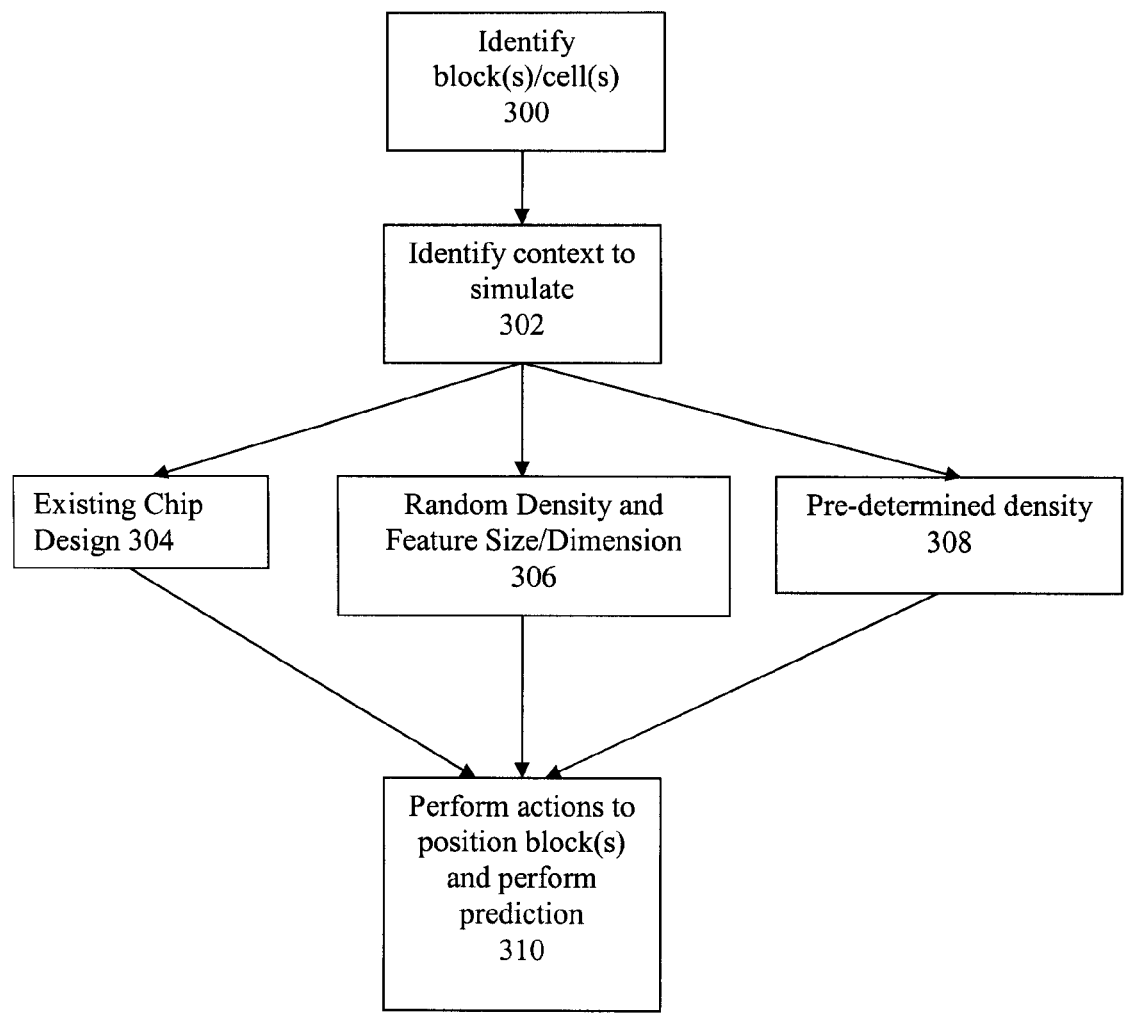
FIG. 3 shows a flowchart of a process for performing context simulation according to an embodiment of the invention.

FIG. 3 shows a high-level overview of an approach for implementing some embodiments of the invention. Initially, a block/cell is identified for processing (300). The block/cell may be an actual design from a library of extracted designs. The block/cell may also be a newly designed block or cell to be implemented into the final IC.

The invention can be used upon a design block that has been completed, even if the surrounding chip design surrounding that block is not yet explicitly known. The approach operates by identifying example or simulated contexts for that block. Therefore, the process identifies the one or more contexts to simulate for the block/cell (302). The one or more contexts may be existing chip designs taken from a library of extracted designs (304). For example, the invention may identify and use several high-volume prior chip designs (or design shrinks) that incorporate such design blocks as the simulated context. The invention is not limited to just using prior chip designs. A simulated context can be created by random or set densities on a layout around the design block, along with random feature sizes/dimensions (306). The bounds of the random density and feature dimensions can be coordinated with design rules or estimated statistics from design data. The one or more contexts may also represent simulated contexts generated by using predefined densities and/or feature sizes/dimensions (308). These predetermined sets of structures may resemble the types of experimental designs used in test structures. The features may include dummy fill where necessary. The terms feature dimensions or feature size refer to dimensions of the geometries within the circuit. Examples of such dimensions include: the width of a line, the spacing between structures (e.g. the spacing between two lines in an array of lines or a buffer distance between working circuitry and dummy fill structures), the critical dimension (CD) of a circuit (i.e. the smallest dimension of any geometry in the circuit), widths of arrays of lines, fill shapes, contact/vias or other repeating structures, as well as the metrics (e.g. minimum, maximum, and average) on individual geometries or on groups of geometries (e.g. an array of lines). Feature dimensions may also include vertical and other dimensions, including sidewall angle, feature height (e.g. trench depth).

Heuristics may be employed to determine the appropriate densities or distributions of densities to use for this approach. Allowable ranges may be set to more closely simulate real designs.

The design block is then placed in the context(s) at different locations (310). At each location, a full chip prediction is performed to predict the physical and geometric parameters of the finished product. The different locations may be selected to address the different types of variations to be analyzed. In one embodiment, it is contemplated that at least three types of location-related variations are analyzed.

Figure 4:
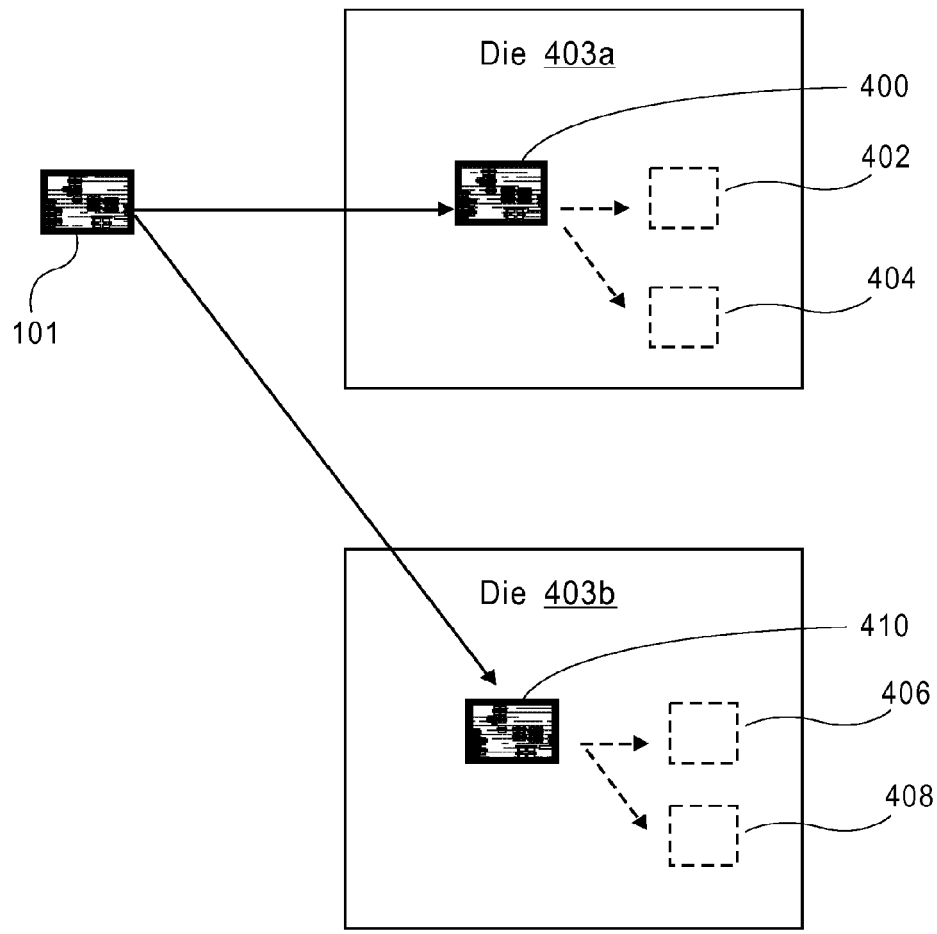
FIG. 4 illustrates a block/cell being placed at different location on dies for context simulation.

A first type of variation is the "within-die" variation. This type of variation exists to cause variations within a single die. Possible causes of this type of variation includes layout interactions. To address this type of variation, the block/cell is placed at different locations within a single die. This is illustrated in FIG. 4, in which block/cell 101 is processed using two simulated dies 403a and 403b. The block/cell 101 is located at multiple locations within each die. For die 403a, the figure illustrates the block/cell 101 being placed at locations 400, 402, and 404. For die 403b, the figure illustrates the block/.cell 101 being placed at locations 406, 408, and 410. Those of ordinary skill in the art would realize that other and additional locations may be selected on the dies as well. Predictions are performed at each of the selected locations within the die(s).

Figure 5:
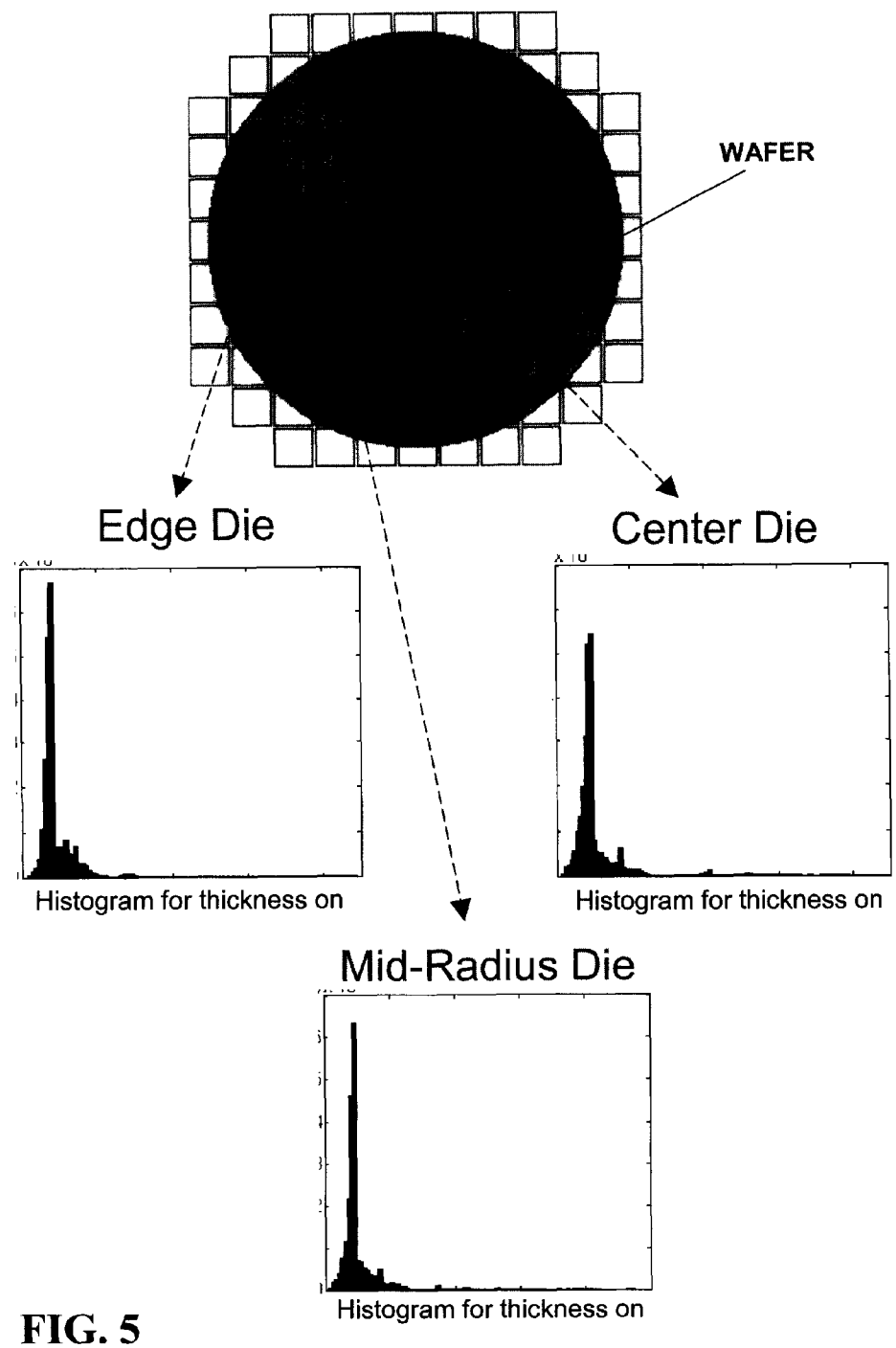
FIG. 5 illustrates a die being placed at different location on a wafer for context simulation.

A second type variation is the "within-wafer" variation. This type of wafer-level variation is based upon variations that may occur between different dies on the same wafer. Possible causes of this type of variation may be based upon the manufacturing tools used on the wafer. Given that a die may be placed at different locations within the wafer, the predicted thickness at a given location within that die may vary with die location. This is illustrated in FIG. 5 in which the location of the die is varied by the radial nature of the wafer and anticipated variation. As such, the die may be placed as a center die, a mid-radius die, and/or as an edge die. Different models may exist for each radial location where data taken from one or more test dies are used to characterize the wafer level variation. Multiple models may be created for each die location or if a mean and range shift is observed to be the most significant effect, one model may be used with modifications to the output distribution. Those of ordinary skill in the art would realize that other and additional locations may be selected on the wafer as well. Predictions are performed at each of the selected locations within the wafer using one or more models.

Figure 6:
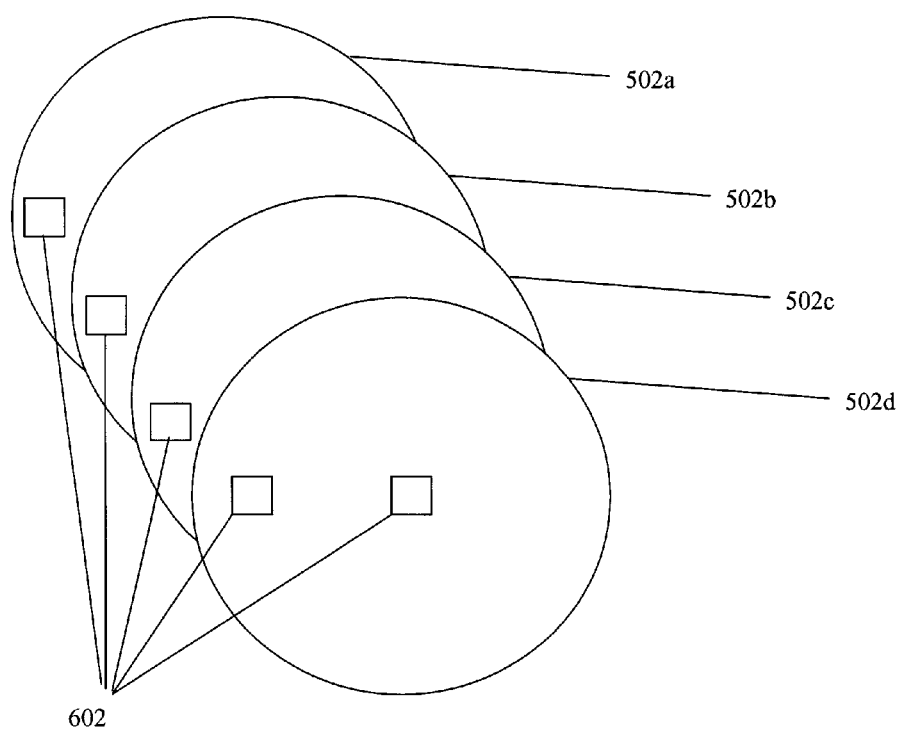
FIG. 6 illustrates context simulation to address wafer-to-wafer or lot-to-lot variations.

A third type variation is the "wafer-to-wafer" or "lot-to-lot" variation. This type of wafer variation is based upon variations that may occur between different wafers or lots of wafers. Possible causes of this type of variation may be based upon drift in calibrations of the manufacturing tools. This is illustrated in FIG. 6 in which predictions are performed to identify the range of variation that may occur for die 602 based upon the different wafers 502a-d.

Figure 7:
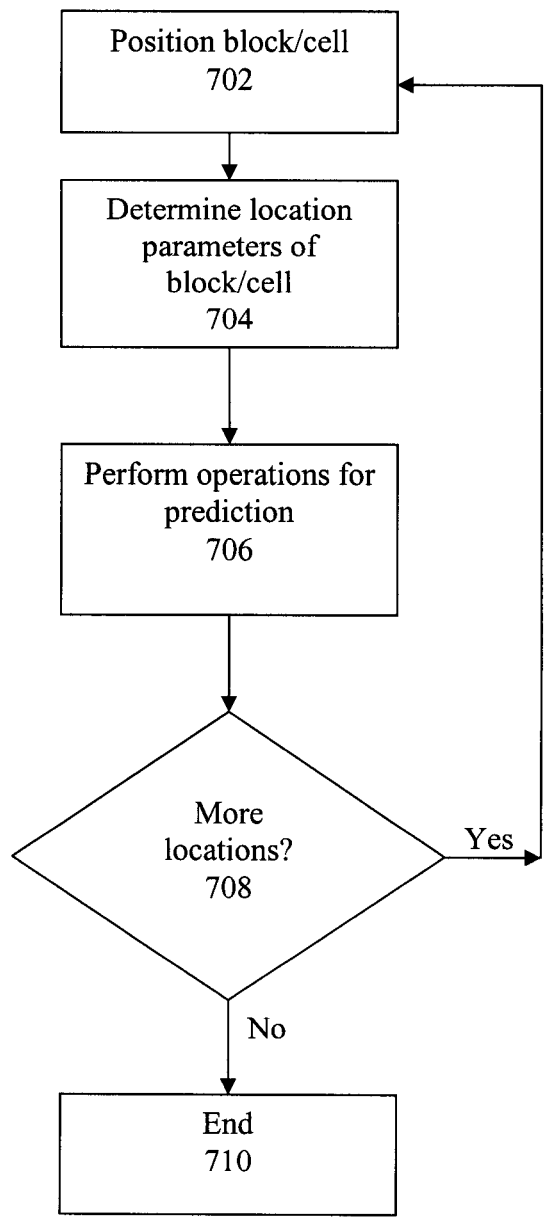
FIG. 7 shows a flowchart of a process for performing context simulation by moving a block or cell according to an embodiment of the invention.

FIG. 7 shows a flowchart of a process for shifting the location of the block/cell to perform the predictions according to an embodiment of the invention. The process begins by positioning the block/cell at a location on the die (702). Many approaches can be used to select the locations for the block/cell. Random sampling can be used to identify a number of randomly selected locations on the die. Alternatively, design information, rules, or design intent can be used to guide the selection of locations that are analyzed. For example, certain portions of the chip may correspond to greater probabilities of variation than other portions of the chip, with these portions warranting greater number of locations to sample for variation analysis. In addition, heuristics may be used to identify locations that provide the greatest likelihood of providing useful analysis data.

The parameters of the selected location are determined and used for prediction (704). Geometry information and location specific parameter information are extracted to perform the extraction process.

Operations are then performed to perform the geometric predictions for the selected location (706). The type of prediction that is performed may change depending upon the type of model and analysis that is desired. For example, for CMP analysis purposes, the process performs thickness predictions at each location. For etch purposes, the process generates width and thickness predictions. For optical lithography, the process generates width predictions. As would be understood by one skilled in the art, the process may be applied to obtain any desired or suitable predictions, including full three-dimensional geometric predictions and analysis.

A determination is made whether any further locations should be selected for the block/cell (708). The block may then be repositioned within the same chip design (simulated context) and the process repeated to acquire more prediction information. Generally, a sampling approach may be taken in which the block is placed at multiple positions on the same chip design and thickness information extracted from those sampled locations. For example, if the invention uses 5 prior chip designs as simulated contexts, and uses 10 locations on each prior chip design, then thickness data for 50 different locations will be acquired from the process.

It is understood that the process does not need to select more locations than is beneficial or needed for analysis purposes. The sampling rate, sampling location, and sampling granularity may be adjusted to minimize the cost of sampling while maximizing the amount of useful data to be acquired. When repositioning within a die, one possible strategy is to reposition the block/cell to sample locations expected to produce the greatest change/variation in geometric prediction, e.g., thickness or density.

The determination of additional locations could be made within the die, across the wafer, and possibly between wafers. As noted with respect to FIGS. 4-6, the type of locations to sample may differ based upon the type of variation to be analyzed.

In one embodiment, the locations to sample are selected ahead of time. The process would proceed by selecting each location in turn until all identified locations have been sampled.

In an alternate embodiment, the number of locations is dynamically determined as the process is being implemented. The process would proceed until a statistically meaningful or statistically acceptable set of samples have been taken. One way to make this determination is to require more samples for more sensitive or variable portions of the die.

If there are additional location to sample, then the process returns back to 702 to position the block/cell to the new location. If no further locations are to be samples, then the process ends (710).

Figure 8:
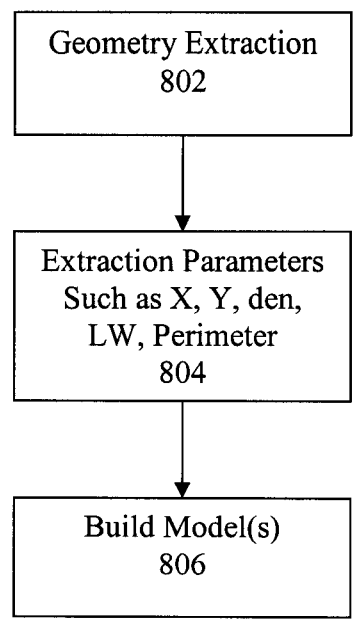
FIG. 8 shows a flowchart of a process for building a model according to an embodiment of the invention.

One of the advantages of the invention is the ability to generate improved models for the design. FIG. 8 shows a flowchart of a process for building models according to an embodiment of the invention. At each selected/sampled location on the die, geometry extraction is performed within the simulated context (802). Examples of information that may be extracted includes (x,y) coordinate data, density data, line width data, and perimeter data (804). Measured fab (fabrication or fabrication facility) data from the associated (x,y) coordinates is also used. In some cases, the models are mathematical representations of the underlying physical and chemical behavior of the process and the data is used to calibrate the mathematical models to accommodate fab tool recipe settings or material types used in the fabrication. In some cases, the models may be direct fits of the input geometric features to the measured output data using some form of function approximation such as regression or neural networks/machine learning method. The models may be based upon data from one die or may include multiple models from multiple die, as illustrated as in FIG. 5. In this case the same extracted data is used to model the different measurement data. Models are built with this information (806). One approach for building models is described in more detail below with respect to FIGS. 14 and 15.

At this point, another process is used to predict geometric characteristics using the model data. To illustrate, assume it is desired to generate predictions for at a location A for a center die and location B for an edge die for a given early stage design. Further assume that a model A has already been generated for location A and a model B has already been generated for a location B.

Figure 9A:
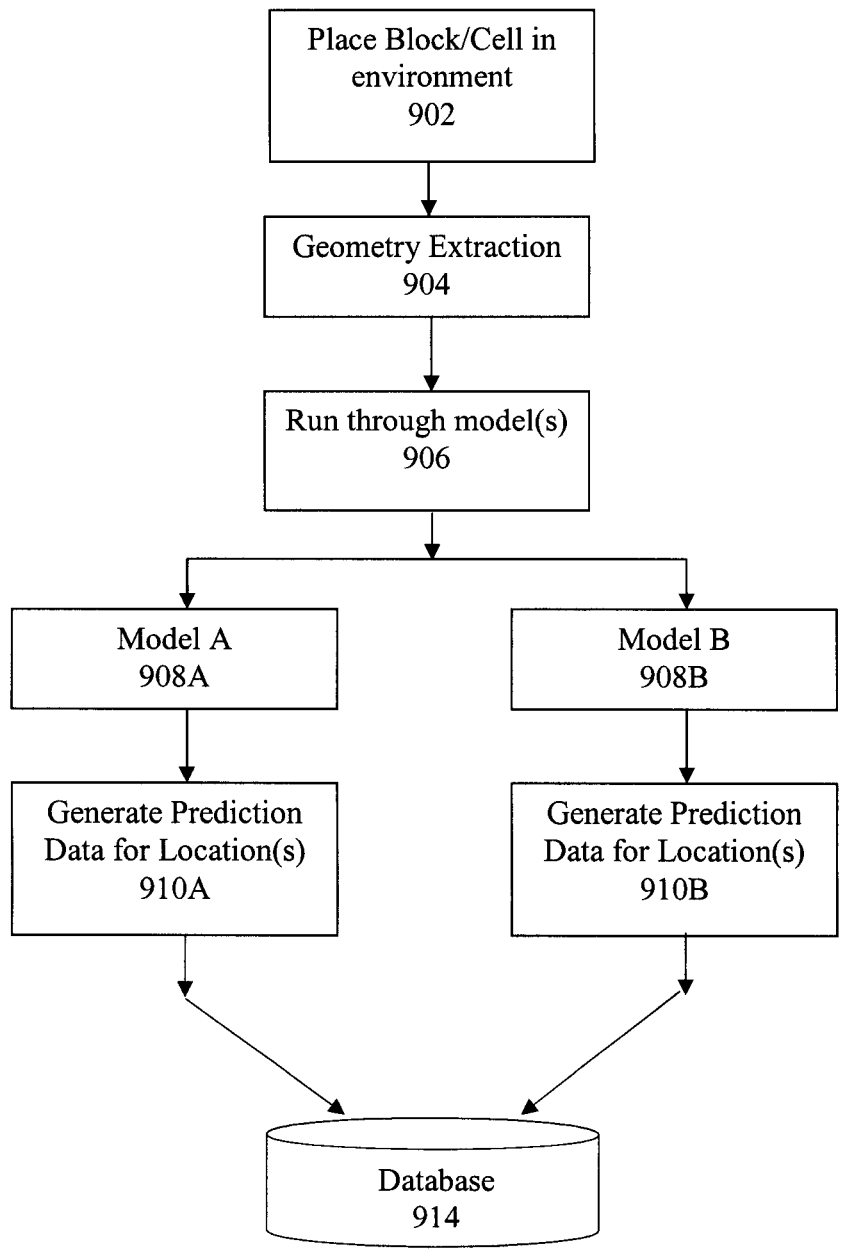
FIGS. 9A-B show flowcharts of processes for generating predictions according to an embodiment of the invention.

FIG. 9A shows a flowchart of an embodiment of a process for predicting geometric characteristics such as thickness or density predictions. The process places the block/cell in the selected locational environment for the analysis (902). Geometry extraction is performed for the selected environment (904).

At this point, the block/cell is analyzed through the models, e.g., the models generated from the process of FIG. 8 (906). For the present example, it is assumed that the block/cell is run through models A and B. For model A (908A), predictions (910A) are generated for locations for Model A. For model B (908B), predictions (910B) are generated for locations for Model B. In this context, the two different models could represent different fab process flows or tool settings, different die locations, different times in the fab process maturity or ramp or different models of within-chip, die-to-die, wafer-to-wafer or lot-to-lot variation.

Figure 9B:
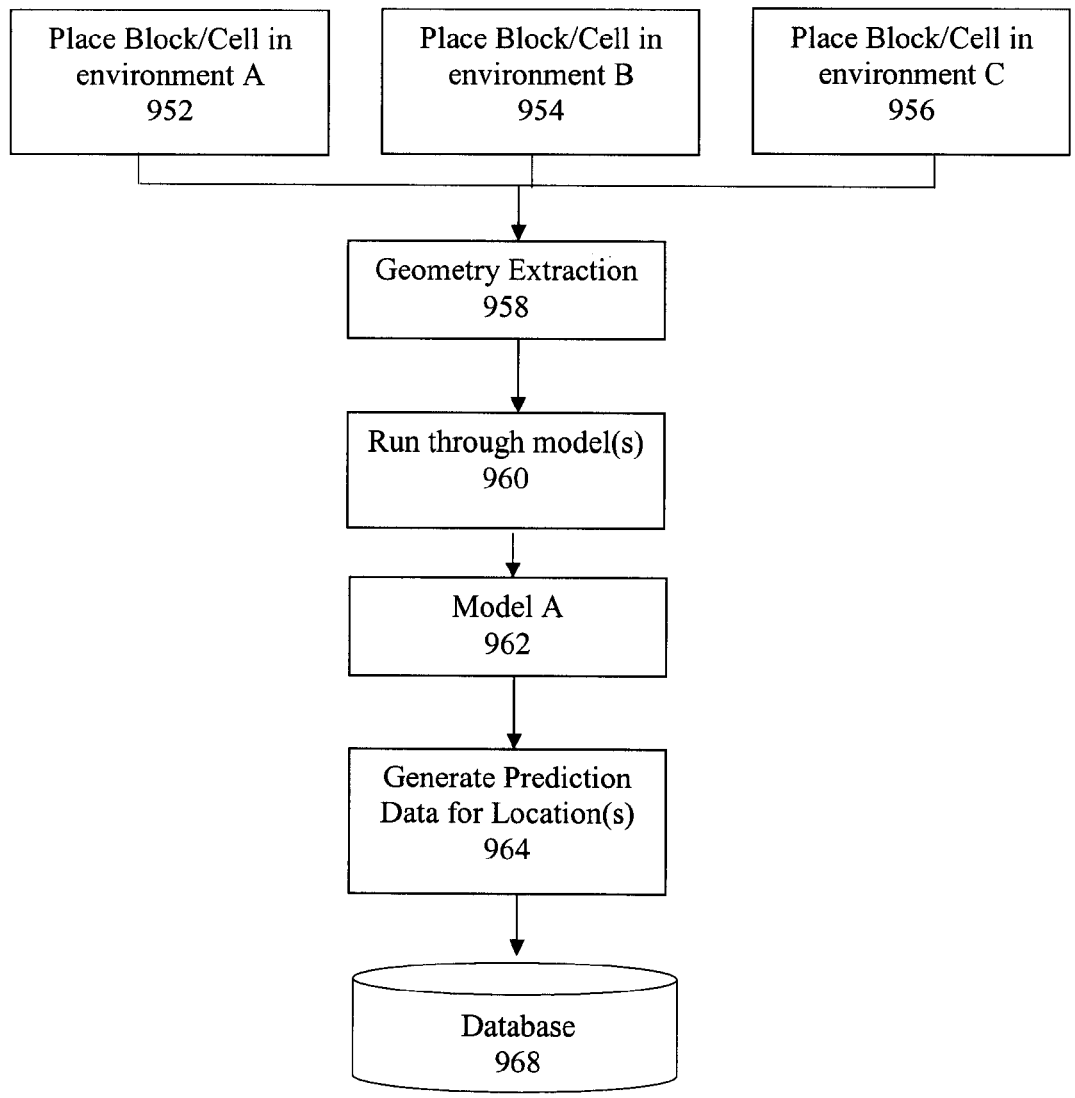

A full chip prediction is then generated based upon the extracted geometric data. For that block at the given position in the simulated context, information is recorded, such as copper and/or dielectric thickness information for CMP models and sidewall angle and trench depth for etch models. The location, geometric descriptions of features (e.g. line width, dielectric thickness, metal density) and the resulting model prediction data can be stored in a database. (914). The database may be used to retrieve data as a function of locations, geometric features and prediction data. In FIG. 9B, the same block/cell are loaded into different environments 952, 954 and 956 which follow the same flow shown in FIG. 9A, e.g., extraction 958, model computations 960, to generate prediction data 964. The different environments could be, for example, three different high volume designs or three different test chip environments such as differing densities. The results are stored in the database 968 which allows the retrieval of data as a function of locations, geometric features, prediction data and environment context.

Figure 10A:
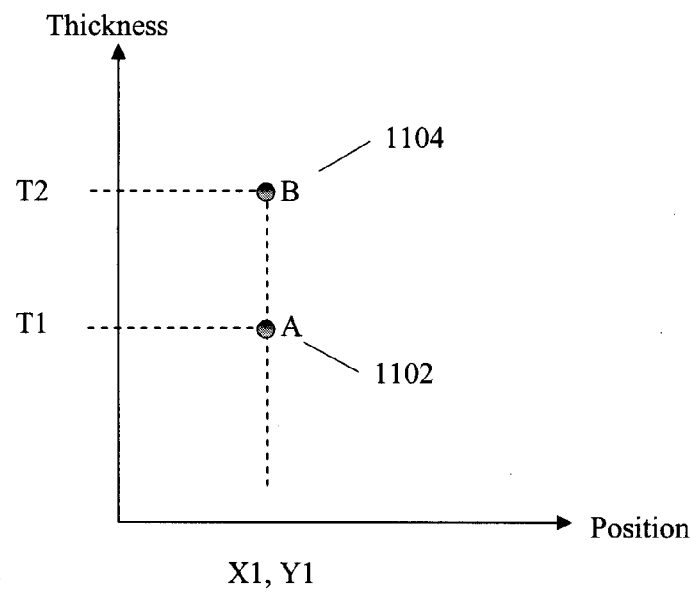
FIGS. 10A-B and 11A-B illustrate example result for performing thickness predictions.

The database allows for statistical representations to be assembled from the data. FIG. 10A graphically shows example predictions for models A and B. In particular, this figure shows a predicted thickness at a given location (x1,y1) for both model A and model B. The chart shows a predicted thickness of T1 1102 at location (x1, y1) for model A and a predicted thickness T2 1104 at location (x1,y1) for model B.

Figure 10B:
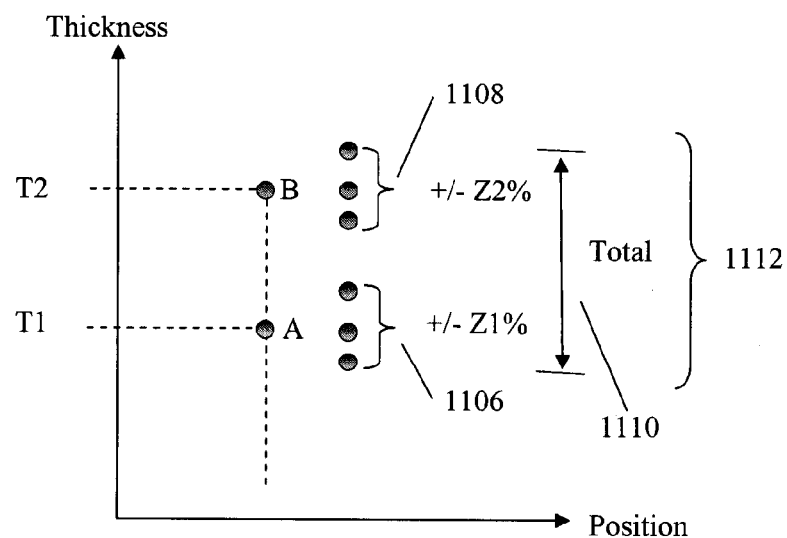

For within-die predictions, each selected location within the die can be analyzed to provide a distribution of values for thickness as a function of the different models. Values such as maximum, minimum, range and mean values can be examined to determine the total within-die variations. The statistics can be aggregated to obtain an overall variation value. Consider the example shown in FIG. 10B. In this example A and B represent, for example, two different models from two different foundries. The prediction at location X1, Y1 is shown for three different die locations 1106 (for model A) or 1108 (For model B) similar to that illustrated in FIG. 5 and the original T1 1102 prediction from FIG. 10A is shown as the middle die in this case for 1106 and the original T2 1104 prediction is shown as the middle die for 1108. For each model A and B, there are now multiple points for a given location and a particular model and for each model a distribution of data for A 1108 and B 1106. From this data, a distribution can be assembled, such as predicted thickness or width as function of location X, Y, as a function of location X,Y and model type, or as a function of die location. Different statistics can be applied to each distribution. For example the distribution of A and B could be combined 1110 and used to define a mean or nominal value and the maximum and minimum values used to define overall percentage change as + or −Z1% or Z2%. There are many ways to statistically combine data from two different models. Some examples are now described. The maximum from 1108 and the minimum thickness from 1106 could be used to estimate the total range of variation across the distributions of models A and B. The data could be combined and the overall mean and variance of the thickness computed as a function of x, y location, total die for both fabs. The data could be normalized and mean-centered within each set 1106 and 1108 and the result combined to examine the relative variance around the nominal thickness per distribution. Also the overall range of variation 1112 could be used as a guard band to ensure features at this location can be simulated appropriately.

Figure 11A:
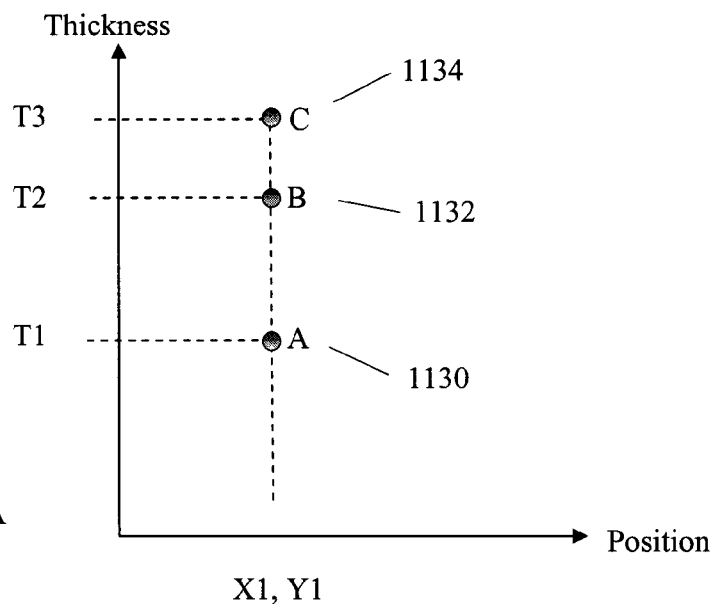

A similar example is provided in FIG. 11A to illustrate the use of multiple environments with one model in FIG. 9B. The model prediction for the three context environments A 952, B 954 and C 956 are shown as thickness or width values T1 at point A 1130, T2 at point B 1132 and T3 at point C 1134. Similarly the die-specific predictions for the edge, center and middle die are shown in FIG. 11B as 1136, 1138, and 1140.

Figure 11B:
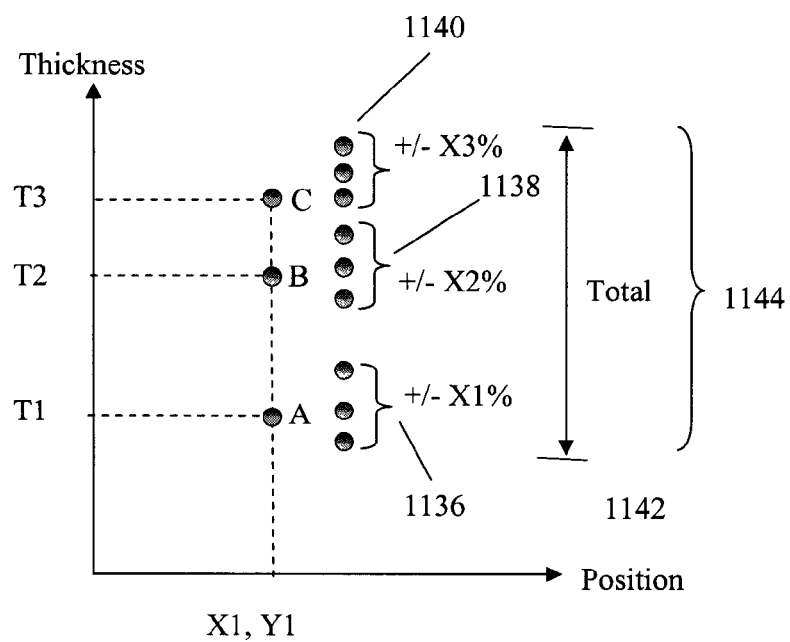

In both examples of FIGS. 10A-B and FIGS. 11A-B, each wafer-to-wafer and lot-to-lot variations could be added to the die level variation to form yet a new distribution and could be used to generate a total guard band 1112 (FIG. 10A) or 1144 (FIG. 11B).

Figure 12:
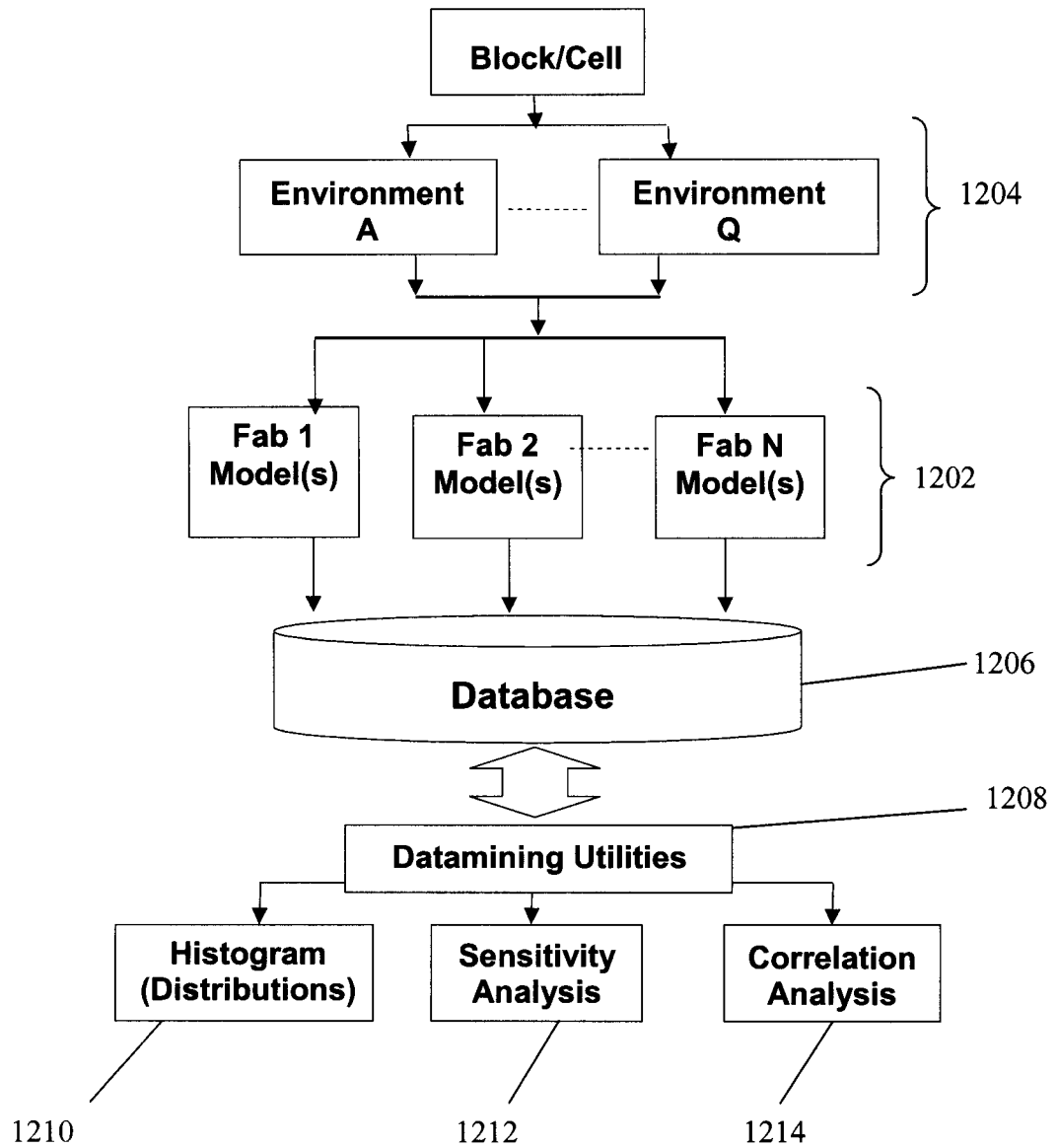
FIGS. 12 and 13 show a processes for using a database to perform analysis according to some embodiments of the invention.
Figure 13:
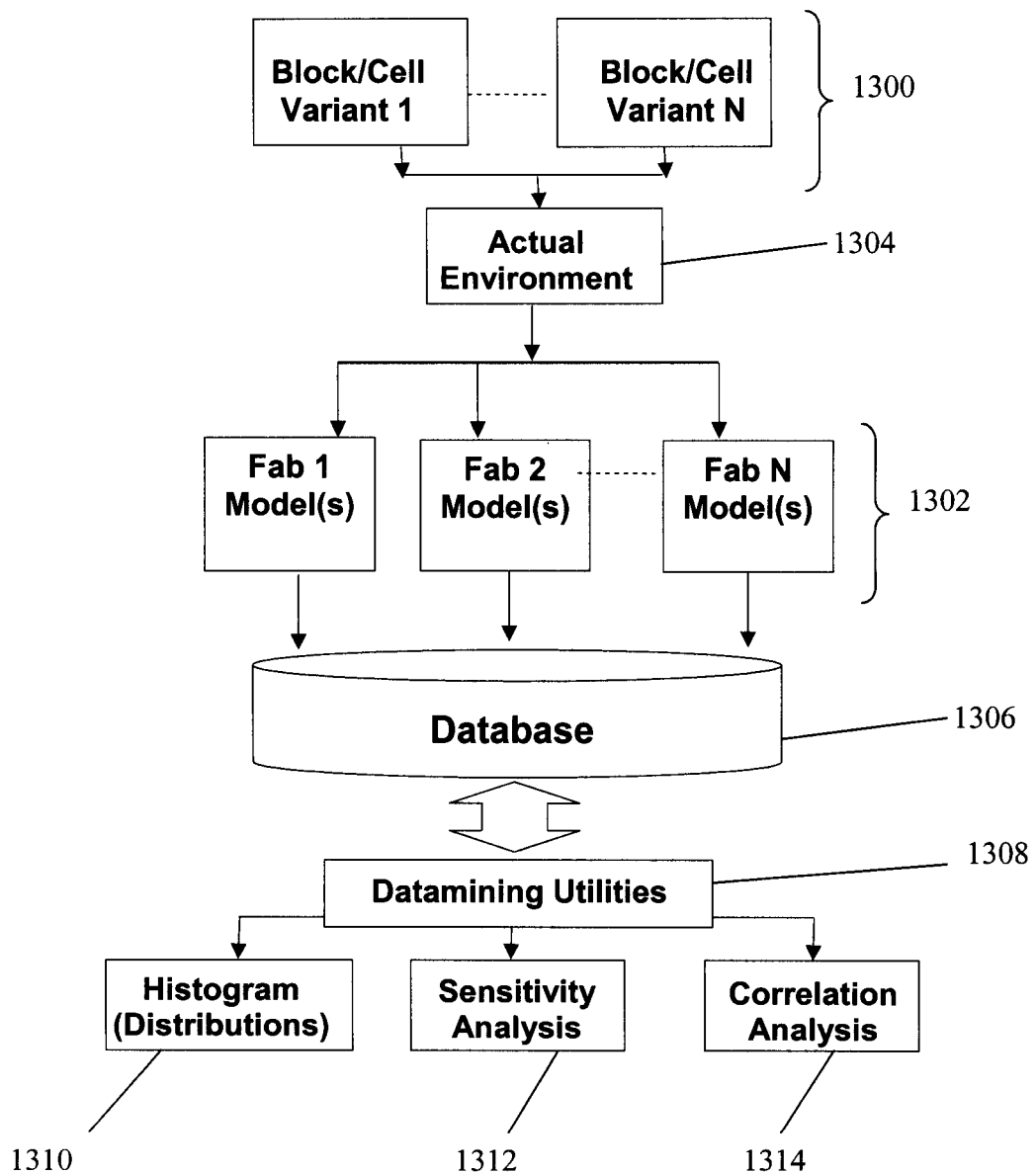

As shown in FIG. 12 and FIG. 13, the database can be analyzed using datamining utilities to extract statistical relationships such histograms, conditional relationships, sensitivities and correlation analysis.

In the case of FIG. 12, multiple models 1202 that represent primary and secondary source fabrication process or process flows are combined with one or more context environments A through Q 1204 that may represent several high volume current or prior node designs. Prediction data based upon analysis of models 1202 and environments 1204 are stored in a database 1206. As noted above, the database 1206 can be analyzed using datamining utilities 1208 to extract statistical relationships such histograms 1210, conditional relationships, sensitivities 1212, and correlation analysis 1214. Examples of methods that may used for this analysis include: principal component analysis, Bayesian, clustering, probability density estimation, correlation and covariance. The data may be mined and used to create new models using methods such as linear regression, principal component regression, partial least squares, nonlinear regression, neural networks, polynomial expressions and decision trees.

FIG. 13 illustrates that the method can be applied to multiple types of blocks/cells having differing levels of sizes, abstraction, completeness, functionality, and detail. The method can be applied to a spectrum of uncertainty from one small cell all the way to a nearly finished design where small variants such as different fill strategies may form the context interaction to be examined. As shown in the figure, multiple types of blocks/cells 1300 may be combined with the context of an actual environment 1304 (or with simulated environments) along with multiple models 1202 that represent primary and secondary source fabrication process or process flows. Prediction analysis is performed and the resulting prediction data is stored in a database 1306. As previously described, the database 1306 can be analyzed using datamining utilities 1308 to extract statistical relationships such histograms 1310, conditional relationships, sensitivities 1312, and correlation analysis 1314.

The data resulting from the inventive methods can be used in a variety of ways. One embodiment may use the database to create or modify design rules. Another embodiment may use the database to modify manufacturing process settings. Another embodiment may use the database to benchmark the sensitivity of a given block/cell to one or more process flows, fabs or foundries. Another embodiment may be used to create one more hierarchies of soft rules where once a 'hard' required rule is met; the data is used to form a soft rule that promotes better yield. Another embodiment allows for correlation with estimated and measured yield.

Another embodiment performs RLC extraction of the design using model predicted parameters such as predicted thickness and width variation of interconnect and transistor level features. The extracted data is fed into timing and power analysis components that characterize the electrical behavior of the device. This information can be stored in the database for additional data mining of electrical and physical parametrics.

Another embodiment uses physical and electrical characterization of cell or blocks to make recommendations on types of environments that are more or less sensitive to variation in one or more specified parameters. Variants of cells and blocks may also be created and included in different environments to create a mapping of which cell or block variant is better suited for a particular environment, such as for a particular density range or particular fab. This information can be provided to a library characterization or optimization system. Example approaches for providing this information is disclosed in co-pending U.S. application Ser. Nos. 11/678,592, 11/678,593, 11/678,594, all filed on Feb. 24, 2007, which are hereby incorporated by reference in their entirety.

An example of a method for characterizing the relationships between multiple parameters is Bayesian networks, but there are a number of general knowledge discovery and datamining (KDD) of database methods that are applicable to traverse the conditional relationships stored in the database. One approach that can be taken to perform this type of analysis is disclosed in Fayyad, U., et al, "Advances in Knowledge Discovery and Data Mining," MIT Press, Cambridge, Mass., 1996. To compute sensitivities, statistical methods may be used as well as gradient techniques where partial derivatives $\partial y/\partial x$ are computed to evaluate the change in parameter y as a function of parameter x.

The variation information can be also used to identify and correct, in advance of lithographic mask creation, areas of an integrated circuit (IC) that are likely to be problematic due to variations, such as variations in film thickness, surface topography uniformity, and electrical impact that arise in the manufacture of an integrated circuit. The identifications or corrections may be based on predicted or modeled physical and electrical properties of a manufactured IC, arising from dependencies between predefined circuit layout patterns and the characteristics of the processes used in the manufacture of the integrated circuit.

One option to address the identified variations is to use the models in which the lithography process flow is defined to include not only the lithography process, but to also include pre and post photoresist deposition and subsequent plasma etch. This may be useful if the actual physical feature dimensions are desired, as an alternative to the patterned feature dimensions that lithography models alone provide. It is recommended to use a pattern dependent etch model that provides additional feature dimensions such as sidewall angle and trench profiles.

The predicted feature dimension variation and the desired feature dimension specification and tolerances can be applied to a verification and correction component which identifies any features that will exceed or approach the tolerances. This component also may be used to correct the dimensions of the identified features within the design layout and in subsequent mask creation so as to achieve the designed (or desired) feature dimensions across the chip. Once these modifications are made to the IC design, dummy fill may be reinserted or adjusted and a new layout generated.

Dummy fill is another method that may be used to improve film thickness uniformity in integrated circuits through the addition of the structures or the removal of existing structures. Adding metal dummy fill increases the pattern density since density is defined as the amount of metal divided by the total area within a given region. Conversely, adding oxide dummy (also called slotting) removes sections of the copper line and decreases the pattern density. The addition of fill can also alter other parameters such as line width and line space. If dummy metal is inserted between two parallel lines, the line space changes for both of those lines. Similarly, if oxide dummy is inserted within a wire, its effective line width is changed. By modifying the existing layout through the addition of dummy fill, physical parameters such as pattern density, line width, and line space are changed.

Electrical simulation may be used to verify the functionality and performance of the IC design. The prediction and specifications of the IC design may be compared to identify problematic areas. Corrections to the IC design are applied to modify the design so that the lithography process yields the desired feature dimension levels. One approach for performing these verification and correction actions is described in co-pending U.S. Patent Publication 20050132306, which is hereby incorporated by reference in its entirety.

The manufacturing models may also be used to guide the layout, floorplanning, and/or routing of an IC design. In effect, the parameters that are used for layout, floorplanning, placement, and routing are guided by the model data so that the layout can be formed with a high degree of manufacturability from the outset. The parameter values can be selected based upon the specific type of design that is being operated upon, so that the layout is optimized for the specific circuit being designed. This can significantly improve upon the "one size fits all" approach used by conventional tools. Further details regarding an approach to implement model-based design is described in co-pending U.S. application Ser. No. 11/648,150, filed on Dec. 29, 2006, which is hereby incorporated by reference in its entirety.

These present invention is applicable to any known IC manufacturing process, including (a) high-density plasma (HDP) and chemical-mechanical polishing (CMP) processes used in the formation of shallow trench isolation (STI) structures; (b) lithographic, high-density plasma (HDP), electroplated copper deposition (ECD), and chemical mechanical polishing (CMP) processes used in the formation of single- and multi-level interconnect structures for integrated circuit (IC) devices; (c) processes and flows used to create oxide and low-k dielectric layers; (d) plasma-etch processes and the measurement of critical feature dimensions; (e) lithographic process flows that may include pre and post photo resist deposition and removal steps and a subsequent plasma etch step used to physically etch the patterned features into the wafer; (f) photoresist deposition and photoresist material selection, (g) any step or steps in damascene process flows; and (h) computation of corrections to mask dimensions to achieve desired critical IC dimensions.

Figure 14:
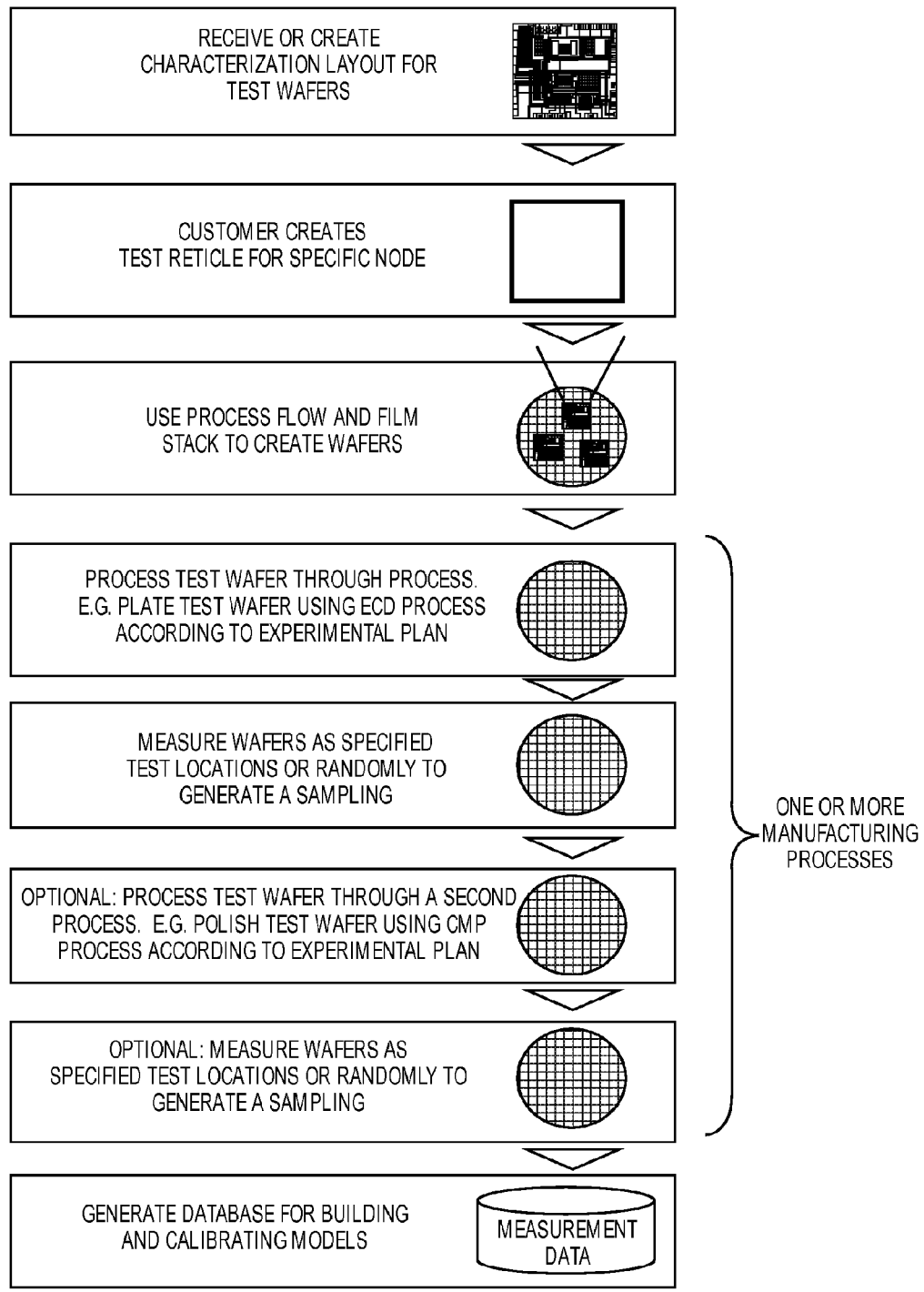
FIGS. 14 and 15 show flowcharts of processes for generating models according to some embodiments of the invention.
Figure 15:
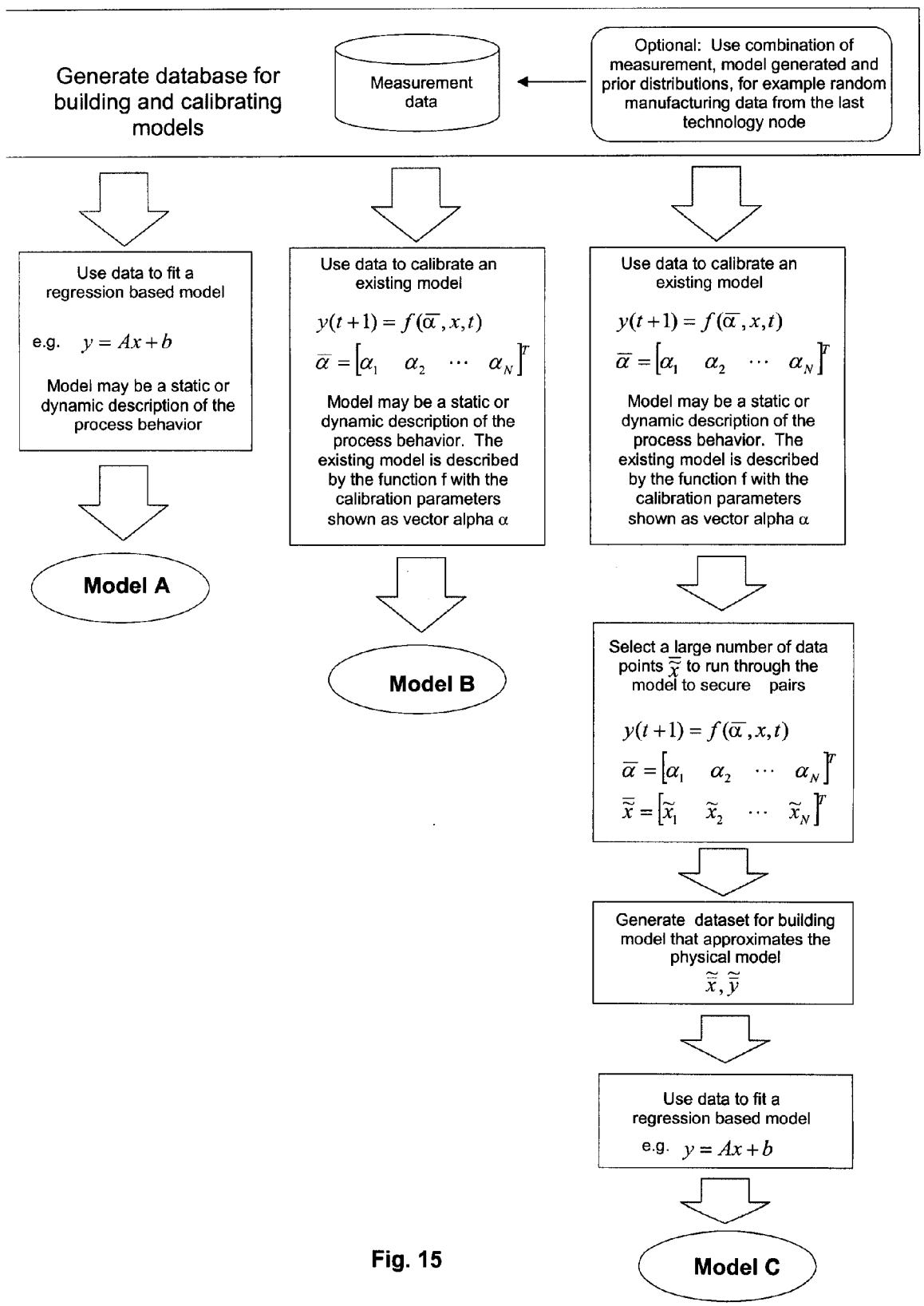

FIGS. 14 and 15 show flows for creating models according to some embodiments of the invention. FIG. 14 shows an example flow for generating calibration data. The flow begins with creation or receipt of a characterization layout for test wafers. The layout may have test structures, test patterns or circuit structures that allow for electrical measurement of the variation. The characterization test layout is used to create a reticle. The reticle is used with a manufacturing flow to define test structures and patterns used to characterize a process step or process flow. The test wafer is processed and measurements are made at specific locations or in some cases, random locations may be used to generate a statistical sample. Optionally, a second process may be used and followed by subsequent measurements. The measured data is stored in a database or in a computer readable form.

FIG. 15 shows three example methods to create models from data. The database may include the measurement data produced by the flow in FIG. 14, model generated data from other test layouts, or prior statistical distributions such as random variation for relevant layout geometries and patterns that have been measured from a process flow.

In the first example on the far left the data is used directly to build an empirical model. An example of this approach would be linear regression as illustrated which has input data x which may describe geometric properties of the layout and uses the database information related to the post-manufacture state (e.g. thickness or width) or variation of the state, y to produce regression parameters A and b. The result of regression produces a model A where an arbitrary layout can be described geometrically in x and the model produces the pattern dependent estimate of the resulting post-manufacture state (e.g. thickness or width) or variation of the state, y. Other examples that may be helpful in modeling nonlinear relationships include locally weighted regression, polynomial regression and neural network approaches.

The example shown in the middle uses the data to calibrate parameters in an existing physical model, $f(x, \alpha)$. The input parameters to the model are in the inputs x which describe geometric properties of the layout and model prediction of variation, y. Certain parameters may be tuned or calibrated and are shown in this example as a vector $\alpha$. The models may be static or dynamic, reflecting a temporal dependence on the previous state of x. The result is a calibrated model B.

The third example shown on the far right uses a physical model to produce a high fidelity model. This may be helpful when there is not enough measurement data to create a purely empirical fit and some physical behavior of the pattern dependencies can be captured in a mathematical representation, $y=f(x)$. This approach may also be helpful in creating a computationally simple abstraction of the higher fidelity model. The calibrated model is used to generate a larger data set of input and output pairs, $\tilde{x}$, $\tilde{y}$. This volume of data is used to create a linear or nonlinear regression model, as described for model A. The result is generating the regression parameters A and b for the abstracted model C.

System Architecture Overview

Figure 16:
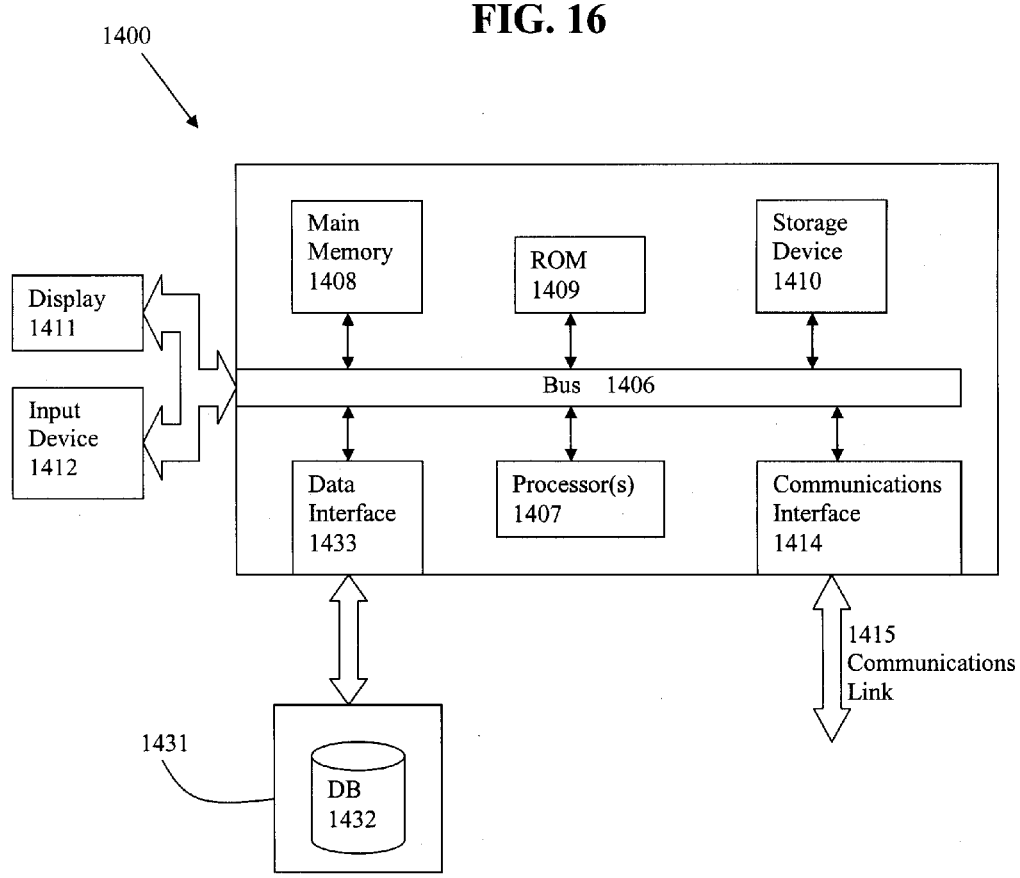
FIG. 16 shows an architecture of an example computing system with which the invention may be implemented.

FIG. 16 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media, volatile media, and transmission media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A computer implemented method implementing an integrated circuit design, comprising:
    using at least one processor to perform a process, the process comprising:
    identifying a circuit feature to be designed in the integrated circuit design;
    identifying information or data for the circuit feature from at least one of a set comprising a prior design that includes the circuit feature, a random density of circuit features around the circuit feature in the integrated circuit design, or one or more design rules or constraints; and
    generating at least one context or environment, which includes at least one circuit feature with a random dimension or a random size, based at least in part upon the information or data that are identified to predict potential interactions between the circuit feature and the at least one context or environment during manufacturing by positioning the circuit feature at a plurality of locations within the at least one context or environment, wherein
        the potential interactions comprise a variation in the circuit feature caused by the at least one circuit feature with the random dimension or the random size in the at least one context or environment.

2. The computer implemented method of claim 1, in which the information or data for the circuit feature is identified based at least in part on one or more actual IC designs or layouts.

3. The computer implemented method of claim 2, in which the one or more actual IC designs or layouts have features reduced or enlarged to simulate a technology node or generation.

4. The computer implemented method of claim 1, in which a section of the integrated circuit design is analyzed in conjunction with the at least one context or environment, wherein the section comprises a cell, macro or block of a design.

5. The computer implemented method of claim 4, further comprising scoring, ranking or recommending characterized IP, cells or blocks.

6. The computer implemented method of claim 1 utilized as part of library creation, modification or characterization.

7. The computer implemented method of claim 1 utilized within an optimization loop to evaluate or modify a design.

8. The computer implemented method of claim 1 to generate model creation data to create one or more models.

9. The computer implemented method of claim 8, in which the one or more models characterizes variation resulting from anyone of the following processes: the chemical mechanical polishing or CMP process, the etch process, the lithography process, deposition process or dopant implant process.

10. The computer implemented method of claim 1, in which results of predicting the potential interactions are used to determine placement of the section within an actual layout, determine shape or location of wires during routing, determine shape and location of dummy fill within the design, generate design rules, predict or assess yield associated with any design that contains the section, generate layout patterns for pattern based hotspot matching, create or modify an OPC strategy, generate distribution of variation data based on one or more contexts or environments, simulate the electrical impact of the variation, compute statistical timing values, create or modify comer cases for RC extraction, compute resistance or capacitance for any part of the section, evaluate the sensitivity of the section to the environment, modify any part of the layout contained in the section, reduce the sensitivity of the section or any part of the layout within the section to the environment, evaluate one or more levels of a design, create dummy fill shapes and patterns, evaluate the electrical impact of the environment on the section including analysis of timing, power and signal integrity, select embedded third-party IP, evaluate embedded third-party IP, perform physical verification as part of a design process, creating the routing of a design or as part of post-route optimization of a design, or to assess a section of design during any stage of the electronic design process.

11. The computer implemented method of claim 1, in which results of predicting the potential interactions are used to modify a manufacturing process.

12. The computer implemented method of claim 1, in which results of predicting the potential interactions are used to determine at least one of the plurality of locations for making a physical measurement within a wafer or die.

13. The computer implemented method of claim 1, in which results of predicting the potential interactions are used to analyze within-die variation, within-wafer variation, or wafer-to-wafer variation.

14. A computer program product that includes a non-transitory computer readable storage medium, the non-transitory computer readable storage medium comprising a plurality of computer instructions which, when executed by at least one processor, cause the at least one processor to execute a method for implementing an integrated circuit design, the method comprising:
    using at least one processor to perform a process, the process comprising:
    identifying a circuit feature to be designed in the integrated circuit design;
    identifying information or data for the circuit feature from at least one of a set comprising a prior design that includes the circuit feature, a random density of circuit features around the circuit feature in the integrated circuit design, or one or more design rules or constraints; and
    generating at least one context or environment which includes at least one circuit feature with a random dimension or a random size, based at least in part upon the information or data that are identified to predict potential interactions between the circuit feature and the at least one context or environment during manufacturing by positioning the circuit feature at a plurality of locations within the at least one context or environment, wherein the potential interactions comprise a variation in the circuit feature caused by the at least one circuit feature with the random dimension or the random size in the at least one context or environment.

15. The computer program product of claim 14, the process further comprising:

scoring, ranking or recommending characterized IP, cells or blocks.

16. The computer program product of claim 14, in which the information or data for the circuit feature is identified based at least in part on one or more actual IC designs or layouts, and the one or more actual IC designs or layouts have features reduced or enlarged to simulate a technology node or generation.

17. The computer program product of claim 14, the process further comprising at least one of:

evaluating or modifying a design; and generating model creation data to create one or more models.

18. A system for implementing an integrated circuit design, comprising:

at least one process that is to:

identify a circuit feature to be designed in the integrated circuit design;

identify information or data for the circuit feature from at least one of a set comprising a prior design that includes the circuit feature, a random density of circuit features around the circuit feature in the integrated circuit design, or one or more design rules or constraints; and generate at least one context or environment which includes at least one circuit feature with a random dimension or a random size, based at least in part upon the information or data that are identified to simulate potential interactions between the circuit feature and the at least one context or environment during manufacturing by positioning the circuit feature at a plurality of locations within the at least one context or environment, wherein the potential interactions comprise a variation in the circuit feature caused by the at least one circuit feature with the random dimension or the random size in the at least one context or environment.

19. The system of claim 18, the at least one processor is further to:

score, rank, or recommend one or more characterized IP, cells or blocks.

20. The system of claim 18, the at least one processor is further to:

evaluate or modifying a design; and generate model creation data to create one or more models.

* * * * *